(12) United States Patent
Wu et al.

(10) Patent No.: US 10,754,462 B2
(45) Date of Patent: Aug. 25, 2020

(54) TOUCH SCREEN AND TOUCH DISPLAY DEVICE

(71) Applicants: BOE TECHNOLOGY GROUP CO., LTD., Beijing (CN); Chongqing BOE Optoelectronics Technology Co., Ltd., Chongqing (CN)

(72) Inventors: Junhui Wu, Beijing (CN); Xin Bi, Beijing (CN); Jiandong Guo, Beijing (CN); Zhongshan Wu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 81 days.

(21) Appl. No.: 16/135,250

(22) Filed: Sep. 19, 2018

(65) Prior Publication Data
US 2019/0095020 A1 Mar. 28, 2019

(30) Foreign Application Priority Data

Sep. 27, 2017 (CN) .......................... 2017 1 0890906

(51) Int. Cl.
*G06F 3/041* (2006.01)
*G02B 5/20* (2006.01)
(Continued)

(52) U.S. Cl.
CPC ........... *G06F 3/0412* (2013.01); *G02B 5/201* (2013.01); *G02B 5/3025* (2013.01); *G06F 3/044* (2013.01);
(Continued)

(58) Field of Classification Search
CPC .................. G06F 3/0412; G06F 3/044; G06F 2203/04112; G06F 2203/04104; G06F 3/042; G02B 5/201; G02B 5/3025
See application file for complete search history.

(56) References Cited

U.S. PATENT DOCUMENTS 8,777,474 B2   7/2014 Shim et al.
8,908,113 B2   12/2014 Sumi et al.
(Continued)

FOREIGN PATENT DOCUMENTS

CN   101978311 A   2/2011
CN   103676166 A   3/2014
(Continued)

OTHER PUBLICATIONS

First Office Action, including Search Report, for Chinese Patent Application No. 201710890906.9, dated Feb. 6, 2020, 19 pages.

*Primary Examiner* — Andrew Sasinowski
(74) *Attorney, Agent, or Firm* — Westman, Champlin & Koehler, P.A.

(57) ABSTRACT

A touch screen and a touch display device are provided in the present disclosure. The touch screen includes a substrate; a touch electrode pattern on the substrate; an optical interrupting pattern on a side of the touch electrode pattern facing away from the substrate; wherein in an effective display region of a display screen, at least a portion of an orthographic projection of the optical interrupting pattern on the substrate falls into an orthographic projection of the touch electrode pattern on the substrate to form a plurality of overlapping regions spaced apart from each other.

18 Claims, 5 Drawing Sheets

(51) Int. Cl.
*G02B 5/30* (2006.01)
*G06F 3/044* (2006.01)

(52) U.S. Cl.
CPC .............. *G06F 2203/04104* (2013.01); *G06F 2203/04112* (2013.01)

(56) References Cited

U.S. PATENT DOCUMENTS

| | | |
|---|---|---|
| 8,970,550 B2 | 3/2015 | Yu et al. |
| 9,983,703 B2 | 5/2018 | Lee et al. |
| 10,139,941 B2 | 11/2018 | Zhang et al. |
| 10,481,715 B2 | 11/2019 | Guo et al. |
| 2011/0044058 A1 | 2/2011 | Shim et al. |
| 2014/0063378 A1 | 3/2014 | Sumi et al. |
| 2014/0333847 A1 | 11/2014 | Yu et al. |
| 2015/0242005 A1 | 8/2015 | Lee et al. |
| 2017/0160846 A1* | 6/2017 | Wang .................. G02F 1/155 |
| 2017/0192548 A1* | 7/2017 | Yang .................. G06F 3/041 |
| 2017/0205959 A1* | 7/2017 | Seong ................. G06F 3/0412 |
| 2017/0212622 A1 | 7/2017 | Zhang et al. |
| 2018/0180932 A1 | 6/2018 | Xu |
| 2018/0210588 A1 | 7/2018 | Guo et al. |

FOREIGN PATENT DOCUMENTS

| | | |
|---|---|---|
| CN | 104142745 A | 11/2014 |
| CN | 104461156 A | 3/2015 |
| CN | 204229078 U | 3/2015 |
| CN | 104866130 A | 8/2015 |
| CN | 104978072 A | 10/2015 |
| CN | 105446532 A | 3/2016 |
| CN | 106648219 A | 5/2017 |

\* cited by examiner

TOUCH SCREEN AND TOUCH DISPLAY DEVICE

CROSS-REFERENCE TO RELATED APPLICATION

The present application claims the benefit of Chinese Patent Application No. 201710890906.9 filed on Sep. 27, 2017 in the China National Intellectual Property Administration, the whole disclosure of which is incorporated herein by reference.

FIELD OF THE INVENTION

The present disclosure relates to a field of display technology, and more specifically, to a touch screen and a touch display device.

DESCRIPTION OF THE RELATED ART

With the development of technology, touch function (also known as touch control function) has become one of the fundamental functions of most display devices, especially portable display devices. In an On Cell technology which is widely used in these days, a touch electrode layer newly introduced into the touch screen usually has a pattern with a certain periodicity for the convenience of design and manufacturing. In a process of display, such a pattern of the touch electrode with periodicity, tends to be optically diffracted with an original periodic configuration in the touch screen, thereby cause moire defects.

SUMMARY OF THE INVENTION

According to an aspect of the present disclosure, there is provided a touch screen comprising: a substrate; a touch electrode pattern on the substrate; an optical interrupting pattern on a side of the touch electrode pattern facing away from the substrate; wherein in an effective display region of a display screen, at least a portion of an orthographic projection of the optical interrupting pattern on the substrate falls into an orthographic projection of the touch electrode pattern on the substrate to form a plurality of overlapping regions spaced apart from each other.

In an embodiment of the present disclosure, in the effective display region, the orthographic projection of the optical interrupting pattern on the substrate falls into the orthographic projection of the touch electrode pattern on the substrate completely.

In an embodiment of the present disclosure, in the effective display region, the optical interrupting pattern comprises a first portion and a second portion, an orthographic projection of the first portion on the substrate falls into the orthographic projection of the touch electrode pattern on the substrate completely.

In an embodiment of the present disclosure, the touch screen further comprises a non-display region, in which the orthographic projection of the touch electrode pattern on the substrate falls into the orthographic projection of the optical interrupting pattern on the substrate completely.

In an embodiment of the present disclosure, the touch electrode pattern is a periodic pattern; an absolute value of a difference between a distance of two adjacent overlapping regions in a first direction and a first periodic distance of the touch electrode patterns in the first direction is not more than 50% of the first periodic distance; and an absolute value of a difference between a distance of two adjacent overlapping regions in a second direction and a second periodic distance of the touch electrode patterns in the second direction is not more than 50% of the second periodic distance.

In an embodiment of the present disclosure, the first periodic distance is 15-60 µm, and the second periodic distance is 60-500 µm, the distance between two adjacent overlapping regions in the first direction is 7.5-90 µm, and the distance between two adjacent overlapping regions in the second direction is 30-750 µm.

In an embodiment of the present disclosure, the touch electrode pattern comprises: a plurality of first electrodes spaced apart in the first direction and extending in the second direction; and a plurality of second electrode groups in a same layer with the plurality of first electrodes, each group of the second electrode groups being disposed between two adjacent first electrodes and comprising a plurality of second electrodes spaced apart in the second direction.

In an embodiment of the present disclosure, the plurality of the second electrodes of two adjacent second electrode groups are mutually staggered.

In an embodiment of the present disclosure, the touch electrode pattern comprises: a first touch electrode on the substrate; an insulating layer on a side of the first touch electrode facing away from the substrate; and a second touch electrode on a side of the insulating layer facing away from the substrate.

In an embodiment of the present disclosure, the first touch electrode comprises a plurality of first sub-electrodes spaced apart in the first direction and extending in the second direction; and the second touch electrode comprises a plurality of second sub-electrodes spaced apart in the second direction and extending in the first direction.

In an embodiment of the present disclosure, the first sub-electrode and the second sub-electrode are in a shape of a strip, a wave, a bow, or a block.

In an embodiment of the present disclosure, the touch electrode pattern is formed of indium tin oxide.

In an embodiment of the present disclosure, a surface of a side of the optical interrupting pattern facing away from the substrate is a curved surface.

In an embodiment of the present disclosure, the optical interrupting pattern comprises a plurality of optical interrupting strips spaced apart in the second direction.

In an embodiment of the present disclosure, the optical interrupting strip is in a shape of a rectangle, a wave or a bow.

In an embodiment of the present disclosure, the optical interrupting pattern is formed of an optical adhesive.

According another aspect of the present disclosure, there is provided a touch display device, comprising: the touch screen mentioned above; and a display screen stacked with the touch screen.

In an embodiment of the present disclosure, the touch display device is an On Cell touch display device or a One Glass Solution (OGS) touch display device.

In an embodiment of the present disclosure, the touch display device is an On Cell touch display device; the display screen comprises an array substrate, a color film substrate and a polarizer which are disposed in sequence; and the touch screen is disposed between the color film substrate and the polarizer, wherein the substrate of the touch screen is disposed close to the color film substrate.

In an embodiment of the present disclosure, the touch display device is an OGS touch display device, and the OGS touch display device comprises a protective cover on a side of the touch screen facing away from the display screen.

DETAILED DESCRIPTION OF PREFERRED EMBODIMENTS OF THE INVENTION

Embodiments of the present disclosure are described in detail below. The embodiments described below are illustrative and are not to be considered as limiting the present disclosure. The specific techniques or conditions which are not indicated in the embodiments are performed according to the techniques or conditions described in the references in the art or in accordance with the product specifications. Any reagents or instruments without a manufacturer to be illustrated are commercially available products.

In the On Cell technology which is widely used in these days, a touch function is achieved by introducing a new touch electrode layer on the surface of a glass substrate. This technology has become one of the prevailing touch technologies because of its advantages of a relatively simple manufacturing process and a light weight and thinness of the prepared product. However, the inventors have found that, in the product with touch screen using a Single Layer On Cell (SLOC) design, such as a tablet or a notebook, the touch electrode pattern is configured to be periodic and a moire defect due to an interference between the periodic touch electrode pattern and the periodic RGB pattern belongs to a common bad yield. In order to avoid a bad yield due to the moire defect, a usually utilized method is to perform a moire simulation before designing the touch electrode pattern so as to found a suitable pattern before manufacturing it. However, as the simulation is not completely consistent with the actual optical process and the error is large, the probability of occurrence of moire defects in the touch electrode pattern obtained by the simulation is still high. Although a loss caused by the above error may be reduced by designing a plurality of test touch electrode patterns for one product, at least one corresponding test mask should be manufactured separately, which increases the development cost while lengthening the development cycle. Moreover, in the current On Cell touch display device, the touch electrodes are deposited above the color film substrate, some of the touch electrodes cannot be covered by the polarizer and are exposed to the external environment, which would likely cause corrosion and line breakage. Inventors have conducted an in-depth research on the above problems and found that an optical adhesive protection layer disposed on the periodic touch electrode pattern may prevent the touch electrode from being corroded and may optically change the touch electrode pattern so as to interrupt the optical continuity of the touch electrode pattern and thus disturb the periodicity of the touch electrode pattern, thereby eliminating moire defects and improving display quality.

Figure 1:
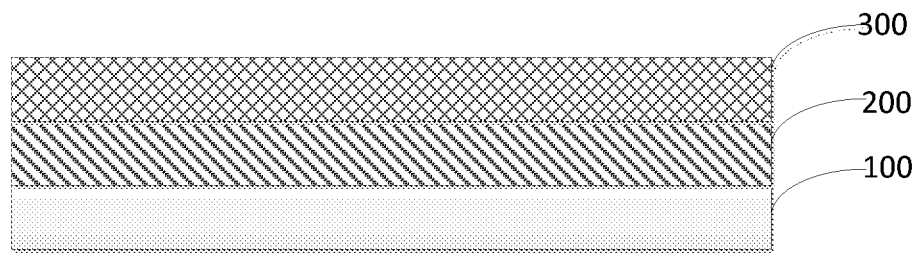
FIG. 1 shows schematically a touch screen according to an embodiment of the present disclosure.

In view of this, according to one aspect of the present disclosure, the present disclosure provides a touch screen. According to an embodiment of the present disclosure, as shown in FIG. 1, the touch screen comprises: a substrate 100; a touch electrode pattern 200 disposed on the substrate 100; an optical interrupting pattern 300 disposed on a side of the touch electrode pattern 200 facing away from the substrate and arranged in an effective display region of the display screen, at least a portion of an orthographic projection of the optical interrupting pattern 300 on the substrate overlaps with a portion of the orthographic projection of the touch electrode pattern 200 on the substrate so as to form a plurality of overlapping regions spaced apart from each other. The touch screen disclosed in the present disclosure has a simple structure and is easy to be implemented. The optical interrupting pattern in the touch screen may interrupt the optical continuity of the touch electrode pattern and disturb the original periodicity of the touch electrode pattern, thereby eliminating the moire defect, improving the display quality, and thus improving the consumer experience.

According to embodiments of the present disclosure, the specific direction of the touch screen when it is being used is not particularly limited. That is, the orientation of the touch electrodes is not particularly limited and can be selected flexibly by those skilled in the art. In some embodiments of the present disclosure, the touch electrode may be disposed on a side of the substrate facing away from the user, or may be disposed on a side of the substrate which is close to the user. Therefore, the touch screen may be applied to different types of touch display devices and has a wide range of application, thereby satisfying market demand.

According to the embodiment of the present disclosure, the specific configuration of the touch electrode pattern is not particularly limited. As long as the touch requirements are satisfied, the touch electrode pattern may be selected flexibly by those skilled in the art as required. In some embodiments of the present disclosure, the touch electrode pattern may comprise a single layer touch electrode or a double-layer touch electrode. Therefore, it has a simple structure, may be prepared conveniently, and has a touch function with a high sensitivity as well as a good performance.

According to the embodiment of the present disclosure, the specific shape of each layer of touch electrode in the touch electrode pattern is not particularly limited, as long as the touch requirements may be satisfied, the shape of each layer of touch electrode may be selected flexibly by those skilled in the art as required. For example, the shape of each layer of touch electrode may be a periodic pattern or a non-periodic pattern, and the specific shape may comprise but is not limited to a strip, a wave, a bow, and the like. In some embodiments of the present disclosure, in order to facilitate the preparation and improve the yield, referring to FIG. 2, the touch electrode pattern is a periodic pattern having a first periodic distance of 15-60 μm in the first direction a and a second periodic distance of 60-500 μm in the second direction b. The touch electrode pattern having such a structure has advantages of a simple manufacturing process, easy to be implemented, cost saving and a high touch sensitivity. In the case where the first periodic distance of the periodic pattern in the first direction a is less than 15 μm, the electrode line in the touch electrode has a small line width and a high line resistance. As a result, the electrode line is apt to be broken and has a low intensity, which adversely affect the yield. In the case where the first periodic distance of the periodic pattern in the first direction a is greater than 60 μm, the pattern has a low light transmittance and thus a significant moire defect, which cause a lower display quality. In the case where the second periodic distance of the periodic pattern in the second direction b is less than 60 μm, the line width is limited, the line resistance is high, and the intensity is decreased, which adversely affects the yield; In the case where the second pattern period of the periodic pattern in the second direction b is greater than 500 μm, the touch electrode pattern has a low light transmittance and thus a significant moire defect, which cause a lower display quality.

Figure 2:
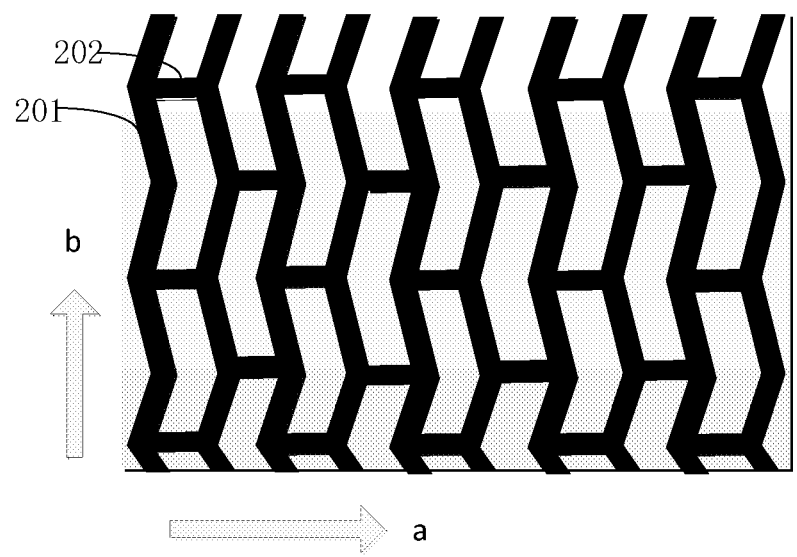
FIG. 2 shows schematically a touch electrode with a single layer design according to an embodiment of the present disclosure.

According to an embodiment of the present disclosure, in the case where the touch electrode pattern is of a single layer design, referring to FIG. 2, the touch electrode comprises: a plurality of first electrodes 201 spaced apart in the first direction a and extending in the second direction b; a plurality of second electrode groups disposed in the same layer as the plurality of first electrodes 201. Each of the second electrode groups, is disposed between two adjacent first electrodes 201 and include a plurality of second electrodes 202 spaced apart in the second direction b. The touch electrode of periodic design has simple fabrication process, is easy to be implemented, and has a good display performance.

According to the embodiment of the present disclosure, the way to dispose the second electrode in the second electrode groups is not particularly limited, and may be selected flexibly by those skilled in the art as long as the requirement of simple fabrication may be satisfied. In some embodiments of the present disclosure, referring to FIG. 2, a plurality of the second electrodes 202 of two adjacent second electrode groups are staggered. The touch electrode having such a configuration is periodic, it preparation process is thus simple, and the display performance is good.

Figure 3:
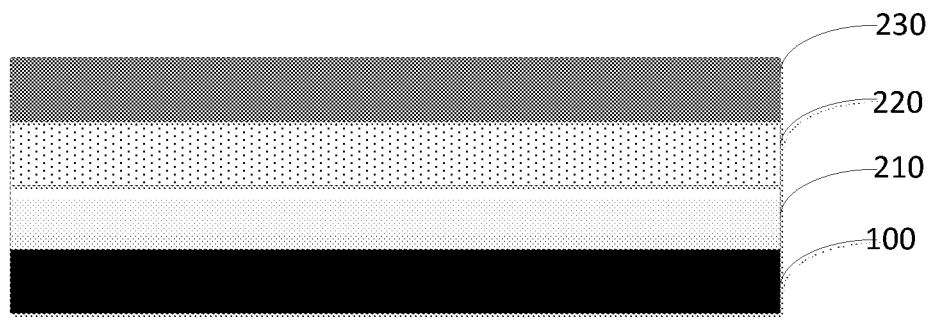
FIG. 3 shows schematically a touch electrode of double-layer design according to an embodiment of the present disclosure.

According to an embodiment of the present disclosure, in the case where the touch electrode pattern is of a double-layer design, referring to FIG. 3, the touch electrode comprises: a first touch electrode 210 disposed on the substrate; an insulating layer 220 disposed on a side of the first touch electrode 210 facing away from the substrate 100; a second touch electrode 230 disposed on a side of the insulating layer 220 facing away from the substrate 100. The touch electrode with the above configuration has a simple structure, may be manufactured easily, and has good display performance.

According to the embodiment of the present disclosure, the specific shapes of the first touch electrode and the second touch electrode are not particularly limited, and may be selected flexibly by those skilled in the art as required. For example, the shape may include but is not limited to the following: the first touch electrode comprises a plurality of first sub-electrodes spaced apart in the first direction and extending in the second direction; the second touch electrode comprises a plurality of second sub-electrodes spaced apart in the second direction and extending in the first direction; and the first sub-electrode and the second sub-electrode may being in a shape of a strip, a wave, a bow, a block, and the like. Therefore, the touch performance requirement may be effectively satisfied, the sensitivity is high, the preparation is simple and convenient, and the yield is high.

According to the embodiment of the present disclosure, the specific material forming the touch electrode pattern is not particularly limited, and may be selected flexibly by those skilled in the art. In some embodiments of the present disclosure, the material forming the touch electrode pattern may comprise indium tin oxide, copper, silver, or the like. In some specific embodiments of the present disclosure, the material forming the touch electrode pattern is indium tin oxide. It is found by inventors that indium tin oxide is suitable to be used as the material of the touch electrode pattern due to its high light transmittance, which leads to a good display performance.

According to the embodiment of the present disclosure, the specific manner in which the optical interrupting pattern is disposed is not particularly limited, and may be selected flexibly by those skilled in the art as long as the requirement of interrupting the periodicity and continuity of the touch electrode pattern may be satisfied. In some embodiments of the present disclosure, the optical interrupting pattern may be a periodic pattern or a non-periodic pattern, as long as a portion of the orthographic projection of the touch electrode pattern on the substrate overlaps with the orthographic projection of the optical interrupting pattern on the substrate while another portion of the orthographic projection of the touch electrode pattern on the substrate does not overlap with the orthographic projection of the optical interrupting pattern on the substrate. In this way, the overlapping region of the optical interrupting pattern and the touch electrode pattern has a different light propagation path from the non-overlapping region thereof. The periodicity and the continuity of the touch electrode pattern are thus interrupted, and thus the moire defect is effectively reduced.

Figure 4:
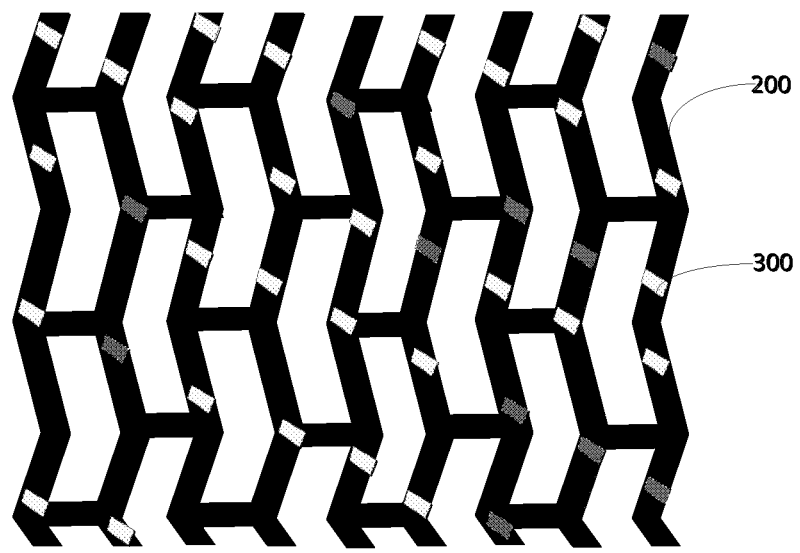
FIG. 4 shows schematically the overlapping regions of the orthographic projections of an optical interrupting pattern and a touch electrode pattern on a substrate according to an embodiment of the present disclosure.
Figure 5:
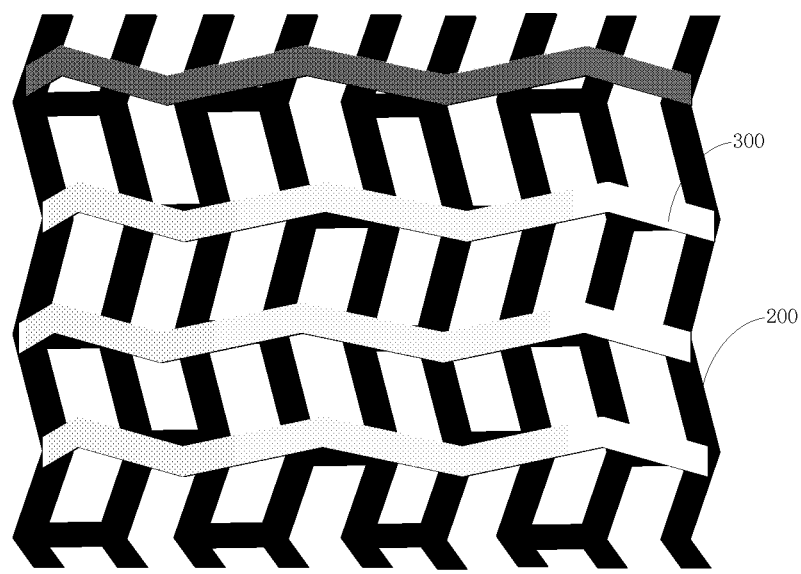
FIG. 5 shows schematically the overlapping regions of the orthographic projections of an optical interrupting pattern and a touch electrode pattern on a substrate according to another embodiment of the present disclosure.

According to some embodiments of the present disclosure, in the effective display region, referring to FIG. 4, the orthographic projection of the optical interrupting pattern 300 on the substrate falls into the orthographic projection of the touch electrode pattern 200 on the substrate. The arrangement of the optical interrupting pattern described above may save the material forming the optical interrupting pattern and effectively avoid the moire defect. According to some other embodiments of the present disclosure, in the effective display region, referring to FIG. 5, the optical interrupting pattern 300 comprises a first portion and a second portion, and only the orthographic projection of the first portion on the substrate falls into the orthographic projection of the touch electrode pattern 200 on the substrate. The optical interrupting pattern described above may be manufactured simply and implemented easily. Thereby, the optical interrupting pattern may interrupt the optical continuity of the touch electrode pattern and reduce the moire defect effectively.

According to the embodiment of the present disclosure, the specific shape of the optical interrupting pattern is not particularly limited, and may be selected by those skilled in the art flexibly as long as the requirement of interrupting the periodicity and continuity of the touch electrode pattern may be satisfied. For example, the shape comprises but is not limited to blocks, strips or other regular or irregular shape. In some specific embodiments of the present disclosure, the optical interrupting pattern comprises a plurality of optical interrupting strips spaced apart in the second direction. In this way, the preparation process may be achieved and implemented easily. The optical interrupting pattern may interrupt the optical continuity of the touch electrode pattern and reduce the moire defect effectively.

Figure 6:
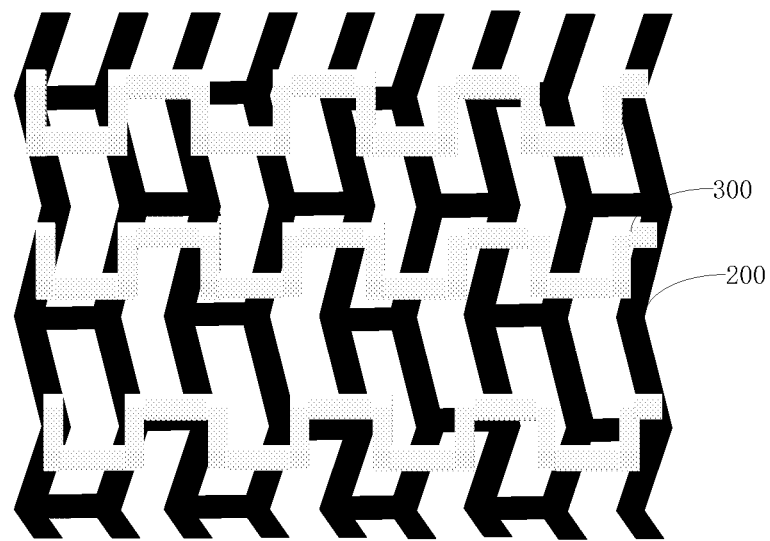
FIG. 6 shows schematically optical interrupting strips according to an embodiment of the present disclosure.
Figure 7:
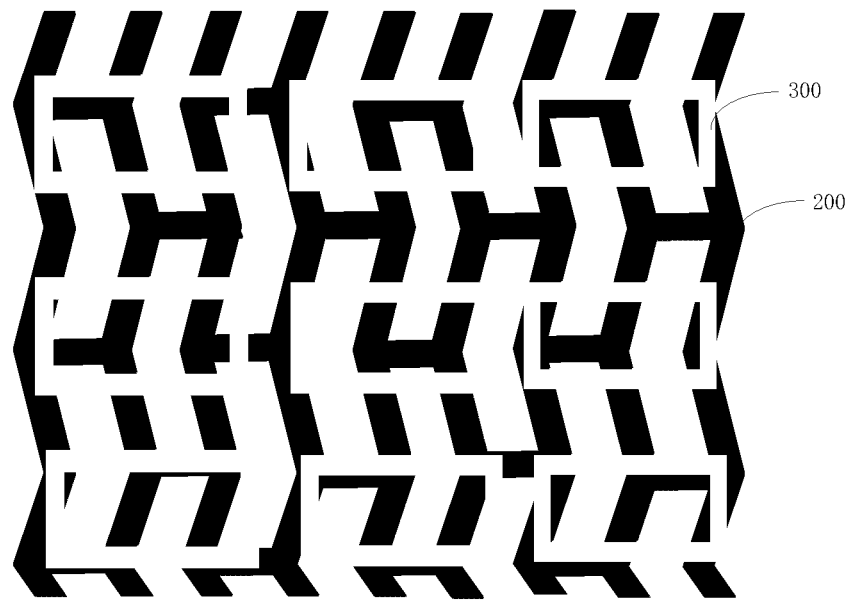
FIG. 7 shows schematically optical interrupting strips according to another embodiment of the present disclosure.

According to the embodiment of the present disclosure, the specific shape for forming the touch electrode pattern is not particularly limited, and may be selected flexibly by those skilled in the art as long as the moire defect may be reduced. In some embodiments of the present disclosure, the optical interrupting strip is in a shape of a wave, a bow or rectangle, and the optical interrupting pattern composed of the optical interrupting strips may be arranged with reference to the optical interrupting pattern 300 in FIG. 5, FIG. 6 and FIG. 7. The optical interrupting pattern described above has a simple structure, and may be implemented easily and reduce the moire defect effectively.

Figure 8:
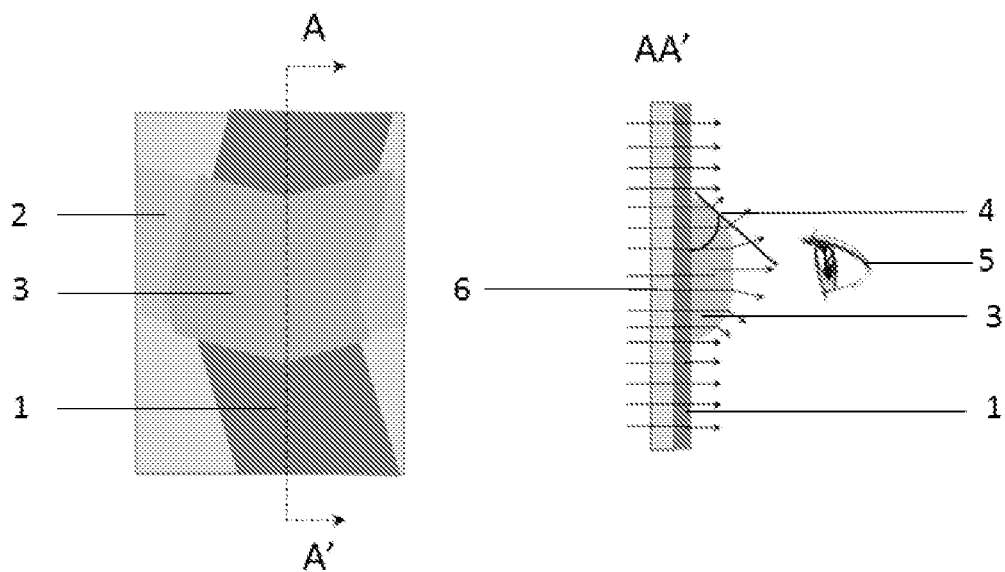
FIG. 8 shows schematically a partial view of the overlapping region of the optical interrupting pattern and the touch electrode pattern according to an embodiment of the present disclosure.

According to the embodiment of the present disclosure, in order to further reduce the moire defect, referring to FIG. 8, the surface of the side of the optical interrupting pattern facing away from the substrate is a curved surface. After the optical interrupting pattern is formed, a certain slope angle 4 is formed by its boundary and the surface of the substrate, so that the surface is formed to be a curved surface structure, and the light 6 is refracted when passing through the surface of the optical interrupting pattern, resulting in partial amplification. Therefore, after the optical interrupting pattern is introduced, it forms an overlapping region 3 and a non-overlapping region 2 with the touch electrode 1. When being watched by the human eye 5, the touch electrode at the overlapping region 3 will differentiate from the touch electrode at the non-overlapping region 2 in shape. In addition, due to the transmittance of the optical interrupting pattern, the touch electrodes viewed from the non-overlapping region 2 may also have different brightness from that of the touch electrode viewed from the overlapping region 3. Due to presence of such difference in shape and brightness, the touch electrode pattern at the overlapping region 3 is optically changed at local position, so as to interrupt the continuity of the touch electrode pattern and disrupt the original periodicity of the touch electrode pattern, thereby reducing the moire defect and improving display quality.

According to the embodiment of the present disclosure, the material forming the optical interrupting pattern is not particularly limited, and may be selected flexibly by those skilled in the art. In some embodiments of the present disclosure, the material forming the optical interrupting pattern is an optical adhesive. The optical adhesive material has a wide source, a low cost, a good light transmittance and a good performance.

In the related art, the touch electrode in the non-display region may not be covered by the polarizer and is exposed to the external environment, thereby readily causing corrosion and thus line breakage. The optical interrupting pattern of the present disclosure may be further extended to a non-display region of the touch screen. In the non-display region, the orthographic projection of the touch electrode pattern on the substrate completely falls into the orthographic projection of the optical interrupting pattern on the substrate. Therefore, in the non-display region, the optical interrupting pattern may effectively cover the touch electrode pattern, thereby avoiding corrosion of the touch electrode in the non-display region.

According to the embodiment of the present disclosure, as described above, the optical interrupting pattern are arranged so that the overlapping region and the non-overlapping region of the optical interrupting pattern and the touch electrode pattern have different light propagation paths in the process of the light propagation, which may effectively interrupt the continuity and periodicity of the touch electrode pattern, thereby reducing the moire defect. Therefore, the above overlapping region is a critical factor to reduce the moire defect. According to the embodiment of the present disclosure, the manner in which two adjacent overlapping regions are disposed is not particularly limited, and may be selected flexibly by those skilled in the art as long as the moire defect may be reduced effectively. Optionally, the distances between two adjacent overlapping regions in the first direction and the second direction are respectively close to the periodic distances of the touch electrode pattern in the first direction and the second direction. For example, the distances between two adjacent overlapping regions in the first direction and the second direction may be slightly less than, equal to or slightly greater than the periodic distances of the touch electrode pattern in the first direction and the second direction respectively. For example, the absolute value of the difference between the distance of two adjacent overlapping regions in the first direction and the first periodic distance of the touch electrode patterns in the first direction is not more than 50% of the first periodic distance. The absolute value of the difference between the distance of two adjacent overlapping regions in the second direction and the second periodic distance of the touch electrode patterns in the second direction is not more than 50% of the second periodic distance. In this way, the effect of reducing the moire defect is excellent. In some embodiments of the present disclosure, the distance between two adjacent overlapping regions in the first direction is 7.5-90 μm, and the distance between two adjacent overlapping regions in the second direction is 30-750 μm. The inventors have found that, through the arrangement of the overlapping regions of the touch electrode pattern and the optical interrupting pattern as described above, the touch electrode pattern and the optical interrupting pattern may match to each other better, thereby effectively reducing the moire defect. When the distance between two adjacent overlapping regions in the first direction or the second direction is not within the above scope, the effect of reducing the moire effect is relatively poor.

According to another aspect of the present disclosure, the present disclosure provides a touch display device. According to the embodiment of the present disclosure, the touch display device comprises: the touch screen described above; and a display screen. The display screen and the touch screen are stacked. Thus, the structure is simple and is easy to be obtained, and the moire defect is not significant, thereby improving the consumer experience.

According to the embodiment of the present disclosure, the type of the touch display device is not particularly limited, and may be selected flexibly by those skilled in the art. In some embodiments of the present disclosure, the touch display device may be an OGS touch display device or an On Cell touch display device. The touch display device above has the advantages of a simple structure, being easy to be implemented, a wide application range, thereby meet the market requirements. Additionally, the touch display device including the touch screen has a weak moire defect and a high display quality, thereby being suitable for marketing.

Figure 9A:
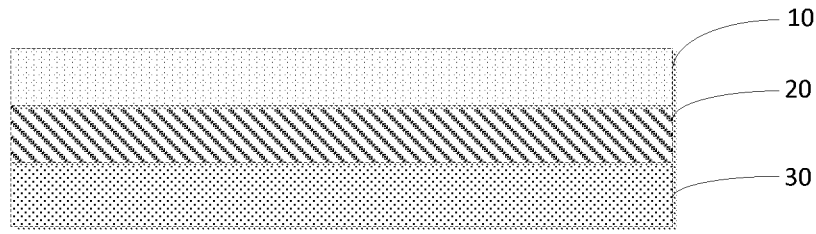
FIG. 9a shows schematically the structure of an OGS (One Glass Solution) touch display device according to an embodiment of the present disclosure.
Figure 9B:
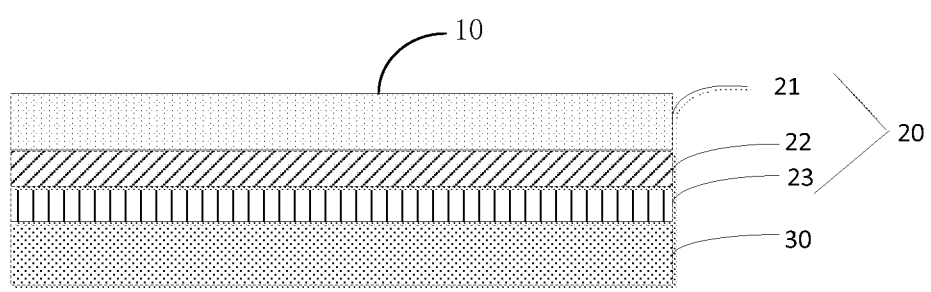
FIG. 9b shows schematically the structure of an OGS touch display device according to another embodiment of the present disclosure.

According to some specific embodiments of the present disclosure, referring to FIG. 9a and FIG. 9b, the OGS touch display device may comprise: a protective cover 10; a touch screen 20 disposed on one side of the protective cover 10; and a display screen 30 disposed on a side of the touch screen 20 facing away from the protective cover 10. Specifically, the structure of the touch display device of the present disclosure is described in detail by taking the touch electrode pattern having a single layer configuration as an example. Referring to FIG. 9b, the protective cover 10 of the touch display device also serves as the substrate 21 of the touch screen. A touch electrode pattern 22 is disposed on the substrate. An optical interrupting pattern 23 is disposed on a side of the touch electrode pattern 22 facing away from the substrate. A display screen 30 is disposed on a side of the optical interrupting pattern 23 facing away from the substrate. The substrate is away from user when the display device is used. In this way, it has the advantages of a simple structure, being easy to be implemented, a wide application range, thereby meet the market requirements. Additionally, the touch display device including the touch screen has a good optical performance and a weak moire defect.

Figure 10:
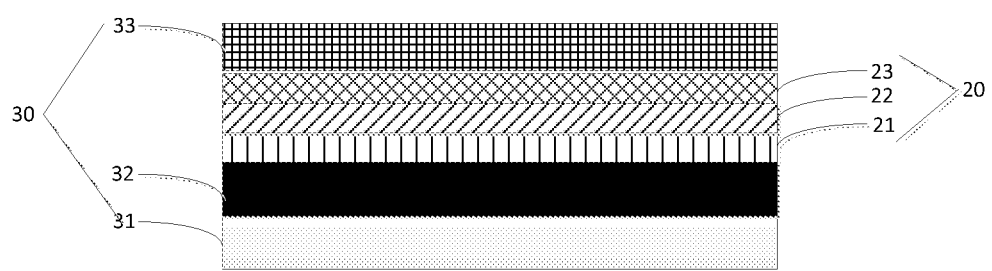
FIG. 10 shows schematically the structure of an On Cell touch display device according to an embodiment of the present disclosure.

According to some embodiments of the present disclosure, referring to FIG. 10, the On Cell touch display device may comprise a display screen 30 and a touch screen 20. The display screen 30 comprises an array substrate 31, a color film substrate 32, and a polarizer 33. The color film substrate 32 is disposed between the polarizer 33 and the array substrate 31. The touch screen 20 is disposed between the color film substrate 32 and the polarizer 33. The touch screen 20 may comprise a substrate 21, a touch electrode pattern 22 disposed on the substrate 21 and an optical interrupting pattern 23 disposed on a side of the substrate facing away from the substrate. The substrate is close to the color film substrate. In this way, it has the advantages of a simple structure, being easy to be implemented, a wide application range, thereby meet the market requirements. Additionally, the touch display device including the touch screen has a good optical performance and a weak moire defect.

According to the embodiment of the present disclosure, in a general touch display device, the touch electrode pattern is usually arranged as a periodic pattern for the sake of simplifying the manufacture. The pattern would interfere with the original periodic structure in the touch screen to generate a significant moire defect, such that the optical performance and the display quality are poor, thereby not being capable to satisfy the demands of the market. In the present disclosure, by forming an optical interrupting pattern on the surface of the touch electrode pattern, the touch electrode pattern may be optically changed, the continuity of the touch electrode pattern is interrupted, and the original periodicity of the touch electrode pattern is disturbed. Therefore, the moire defects may be reduced and the display quality of the touch display device may be improved.

In the description of the present disclosure, it is to be understood that the orientation or position relationship indicated by the terms "width", "upper", "lower", "inside", "outside", etc. is based on the orientation or position relationship shown in the drawings. These terms are used to describe the present disclosure and simplify the description only, but not intended to indicate or suggest that the device or element referred to must have the certain orientation or be operated in the certain orientation, and thus cannot be considered as a limitation to the present disclosure.

Moreover, the terms "first" and "second" are used for descriptive purposes only and are not to be considered as indicating or implying a relative importance or implicitly indicating the number of the referred technical features. Thus, features defined by "first" and "second" may comprise one or more of the features either explicitly or implicitly. In the description of the present disclosure, expression "a plurality" means two or more, unless specifically defined otherwise.

In the present disclosure, the first feature "on" or "under" the second feature may be directly in contact with the second feature or may be indirectly in contact with the second feature through an intermediate medium, unless explicitly stated and defined otherwise. Moreover, expression that the first feature is "above" or "above" the second feature may means that the first feature is right above or obliquely above the second feature, or merely means that the first feature has a level higher than that of the second feature. That the first feature is "below" or "beneath" the second feature may means that the first feature is right below or obliquely below the second feature, or merely means the first feature has a level less than that of the second feature.

In the description of the present specification, the description with reference to the terms "one embodiment", "some embodiments", "example", "specific example", or "some examples" and the like means the specific feature, structure, material or characteristic described in connection with the embodiment or example is contained in at least one embodiment or example of the present disclosure. In the present specification, the schematic representation of the above terms is not necessarily directed to the same embodiment or example. Furthermore, the specific feature, structure, material or characteristics described may be combined in a suitable manner in any one or more embodiments or examples. In addition, various embodiments or examples described in the specification, as well as features of various embodiments or examples, may be combined by those skilled in the art.

While the embodiments of the present disclosure have been shown and described above, it is understood that the above-described embodiments are illustrative and are not to be construed as limiting the scope of the present disclosure. Variations, modifications, alterations and variations of the above-described embodiments may be made by those skilled in the art within the scope of the present disclosure.

What is claimed is:

1. A touch screen comprising:
   a substrate;
   a touch electrode pattern on the substrate;
   an optical interrupting pattern on a side of the touch electrode pattern facing away from the substrate;
   wherein in an effective display region of a display screen, at least a portion of an orthographic projection of the optical interrupting pattern on the substrate falls into an orthographic projection of the touch electrode pattern on the substrate to form a plurality of overlapping regions spaced apart from each other,
   wherein in the effective display region, the orthographic projection of the optical interrupting pattern on the substrate falls into the orthographic projection of the touch electrode pattern on the substrate completely,
   wherein the touch electrode pattern is a periodic pattern; an absolute value of a difference between a distance of two adjacent overlapping regions in a first direction and a first periodic distance of the touch electrode patterns in the first direction is not more than 50% of the first periodic distance; and an absolute value of a difference between a distance of two adjacent overlapping regions in a second direction and a second periodic distance of the touch electrode patterns in the second direction is not more than 50% of the second periodic distance.

2. The touch screen according to claim 1, further comprising a non-display region, in which the orthographic projection of the touch electrode pattern on the substrate falls into the orthographic projection of the optical interrupting pattern on the substrate completely.

3. The touch screen according to claim 1, wherein in the effective display region, the optical interrupting pattern comprises a first portion and a second portion, an orthographic projection of the first portion on the substrate falls into the orthographic projection of the touch electrode pattern on the substrate completely.

4. The touch screen according to claim 1, wherein the first periodic distance is 15-60 μm, and the second periodic distance is 60-500 μm, the distance between two adjacent overlapping regions in the first direction is 7.5-90 μm, and the distance between two adjacent overlapping regions in the second direction is 30-750 μm.

5. The touch screen according to claim 4, wherein the optical interrupting pattern comprises a plurality of optical interrupting strips spaced apart in the second direction.

6. The touch screen according to claim 5, wherein the optical interrupting strip is in a shape of a rectangle, a wave or a bow.

7. The touch screen according to claim 1, wherein the touch electrode pattern comprises:

a plurality of first electrodes spaced apart in the first direction and extending in the second direction; and a plurality of second electrode groups in a same layer with the plurality of first electrodes, each group of the second electrode groups being disposed between two adjacent first electrodes and comprising a plurality of second electrodes spaced apart in the second direction.

8. The touch screen according to claim 7, wherein the plurality of the second electrodes of two adjacent second electrode groups are staggered.

9. The touch screen according to claim 1, wherein the touch electrode pattern comprises:

a first touch electrode on the substrate;

an insulating layer on a side of the first touch electrode facing away from the substrate; and a second touch electrode on a side of the insulating layer facing away from the substrate.

10. The touch screen according to claim 9, wherein the first touch electrode comprises a plurality of first sub-electrodes spaced apart in the first direction and extending in the second direction; and the second touch electrode comprises a plurality of second sub-electrodes spaced apart in the second direction and extending in the first direction.

11. The touch screen according to claim 10, wherein the first sub-electrode and the second sub-electrode are in a shape of a strip, a wave, a bow, or a block.

12. The touch screen according to claim 1, wherein the touch electrode pattern is formed of indium tin oxide.

13. The touch screen according to claim 1, wherein a surface of a side of the optical interrupting pattern facing away from the substrate is a curved surface.

14. The touch screen according to claim 1, wherein the optical interrupting pattern is formed of an optical adhesive.

15. A touch display device, comprising:

the touch screen according to claim 1; and a display screen stacked with the touch screen.

16. The touch display device according to claim 15, wherein the touch display device is an On Cell touch display device or a One Glass Solution (OGS) touch display device.

17. The touch display device according to claim 16, wherein the touch display device is an On Cell touch display device; the display screen comprises an array substrate, a color film substrate and a polarizer which are disposed in sequence; and the touch screen is disposed between the color film substrate and the polarizer, wherein the substrate of the touch screen is disposed close to the color film substrate.

18. The touch display device according to claim 16, wherein the touch display device is an OGS touch display device, and the OGS touch display device comprises a protective cover on a side of the touch screen facing away from the display screen.

* * * * *